United States Patent
Uchida

(10) Patent No.: US 8,720,486 B2
(45) Date of Patent: May 13, 2014

(54) VALVE APPARATUS

(75) Inventor: Yoshinori Uchida, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 83 days.

(21) Appl. No.: 13/358,739

(22) Filed: Jan. 26, 2012

(65) Prior Publication Data

US 2012/0211683 A1  Aug. 23, 2012

(30) Foreign Application Priority Data

Feb. 21, 2011 (JP) ................................ 2011-034697

(51) Int. Cl.
*F16K 17/00* (2006.01)

(52) U.S. Cl.
USPC .............................. 137/599.18; 62/77; 62/292

(58) Field of Classification Search
USPC ...................... 137/599.16, 599.18; 62/77, 292
See application file for complete search history.

(56) References Cited

U.S. PATENT DOCUMENTS

| 2,863,473 | A | * | 12/1958 | Gantz | ...................... | 137/599.18 |
| 3,896,845 | A | * | 7/1975 | Parker | ........................ | 137/493.3 |
| 4,648,369 | A | * | 3/1987 | Wannenwetsch | ............. | 123/467 |
| 7,296,594 | B1 | * | 11/2007 | Phanco | ..................... | 137/599.18 |
| 2009/0294713 | A1 | * | 12/2009 | Harada et al. | ............ | 251/129.15 |

* cited by examiner

*Primary Examiner* — John Rivell
*Assistant Examiner* — Reinaldo Sanchez-Medina
(74) *Attorney, Agent, or Firm* — Bacon & Thomas, PLLC

(57) ABSTRACT

A valve apparatus includes a valve main body provided with a first inlet and outlet, a valve chamber to which a valve port is open, and a second inlet and outlet connected to the valve port. A valve shaft having a valve body portion for opening and closing the valve port is provided in the valve chamber. A relief valve is provided within the valve body portion to relieve a pressure of the valve chamber to the second inlet and outlet when a fluid pressure of the refrigerant within the valve chamber becomes a predetermined pressure or more in a fully closed state in which the valve port is closed by the valve body portion, thereby to automatically relieve a fluid within a valve chamber without causing a cost increase and an enlargement of size.

2 Claims, 4 Drawing Sheets

VALVE APPARATUS

BACKGROUND OF THE INVENTION

1. Field of the Invention

The present invention relates to a valve apparatus such as an electrically operated valve, an electromagnetic valve or the like which is used by being incorporated in a heat pump type cooling and heating system or the like, and more particularly to a valve apparatus provided with a function of a relief valve which can relieve a fluid within a valve chamber in the case that the fluid within the valve chamber comes to a high pressure in a valve closed state.

2. Description of the Conventional Art

Conventionally, as a heat pump type cooling and heating system, there has been known a structure in which two expansion valves are provided for improving an energy saving efficiency or the like, the expansion valve being provided only one normally, in addition to a compressor, an outdoor heat exchanger, an indoor heat exchanger, a four-way switching valve and the like, and check valves are incorporated respectively in two expansion valves in parallel (a structure formed as an expansion valve with check valve) for reducing a pressure loss as much as possible (for example, refer to FIG. 6 of the Japanese Unexamined Patent Publication No. 2010-249246).

Further, there has been recently thought a matter that at least one of two expansion valves with check valve is replaced by an electronically controlled type electrically operated valve (refer to the Japanese Unexamined Patent Publication No. 2009-14056).

FIG. 4 shows an example of a heat pump type cooling and heating system which is provided with an electronically controlled type electrically operated valve serving as the expansion valve with check valve mentioned above. A heat pump type cooling and heating system 100 in an illustrated example is provided with an expansion valve 106 with a check valve 106B corresponding to one of two expansion valves with check valve mentioned above, an electronically controlled type electrically operated valve 10' serving as another of two expansion valves with check valve mentioned above, a distributor 108, a refrigerant recovering tank 120, and service valves for maintenance (manually operated) 121 and 122, in addition to a compressor 101, a four-way switching valve 102, an outdoor heat exchanger 103 and an indoor heat exchanger 104.

Describing in detail, the electrically operated valve 10' and the refrigerant recovering tank 120 are arrange in an outdoor side (the outdoor heat exchanger 103 side) which is right side of two service valves 121 and 122 (which are normally in a fully open state), and the expansion valve 106 with the check valve 106B is arranged in an indoor side (the indoor heat exchanger 104 side) which is left side of two service valves 121 and 122. A temperature sensitive type (a mechanical type) structure is used as an expansion valve 106A of the expansion valve 106 with the check valve, and the check valve 106B is arranged in parallel to the expansion valve 106A.

In this cooling and heating system 100, at a time of a cooling operation, a refrigerant which is compressed by the compressor 101 is introduced into the outdoor heat exchanger 103 via (ports a→d of) the four-way switching valve 102 as shown by a solid arrow in the drawing, and is heat exchanged with an ambient air so as to be condensed, and the condensed refrigerant flows into the expansion valve 106 via the distributor 108, the electrically operated valve 10' (at a maximum opening degree at this time) and the service valve 121, is adiabatically expanded here, thereafter flows into the indoor heat exchanger 104, is heat exchanged with an indoor air in the indoor heat exchanger 104 so as to be evaporated, and cools a room inside. The refrigerant coming out of the indoor heat exchanger 104 is sucked into the compressor 101 via the service valve 122 and (ports b→c of) the four-way switching valve 102.

On the contrary, at a time of a heating operation, the refrigerant which is compressed by the compressor 101 is introduced into the indoor heat exchanger 104 via (ports a→b of) the four-way switching valve 102 and the service valve 122 as shown by a broken arrow in the drawing, and is heat exchanged with the indoor air here so as to be condensed, heats up the room inside, thereafter flows into the electrically operated valve 10' (regulated its opening degree in correspondence to a cooling temperature at this time) through the check valve 106B (bypass the expansion valve 106A), is depressurized here, is thereafter introduced into the outdoor heat exchanger 103 via the distributor 108, is evaporated here, and is thereafter sucked into the compressor 101 via (ports d→c of) the four-way switching valve 102.

Next, a description will be given of an example of the electronically controlled type electrically operated valve 10' which is used in the cooling and heating system 100 as mentioned above with reference to FIG. 3. The electrically operated valve 10' of the illustrated example is provided with a valve shaft 25 which has a lower large diameter portion 25a and an upper small diameter portion 25b and is integrally provided with a valve body portion 24 having a specific shape (two stages of inverted circular truncated cone shapes respectively with predetermined center angles) in a lower end portion of the lower large diameter portion 25a, a valve main body 20 which has a valve chamber 21, a can 40 which is bonded in a sealing manner in its lower end portion to the valve main body 20, a rotor 30 which is arranged in an inner periphery of the can 40 so as to be spaced at a predetermined gap α, a stator 50 which is outward fitted to the can 40 so as to rotationally drive the rotor 30, and a screw feeding mechanism which is arranged between the rotor 30 and the valve main portion 24 and moves the valve body portion 24 close to and away from a valve port 22a by utilizing a rotation of the rotor 30, and is structured such as to regulate a passing flow rate of the refrigerant by changing a lift amount of the valve body portion 24.

The valve chamber 21 of the valve main body 20 is provided with a valve seat 22 formed therein a valve port (an orifice) 22a which the valve body portion 24 comes close to and away from, a first inlet and outlet 11 constructed by a conduit pipe joint is provided in a side portion, and a lower portion of the valve main body 20 is provided with a second inlet and outlet 12 constructed by a conduit pipe joint so as to be connected to the valve port 22a.

The stator 50 is constructed by a yoke 51, a bobbin 52, stator coils 53 and 53, a resin mold cover 56 and the like, a stepping motor is constructed by the rotor 30 and the stator 50, and an elevation driving mechanism for regulating a lift amount (=a valve opening degree) of the valve body portion 24 with respect to the valve port 22a is constructed by the stepping motor, a screw feeding mechanism and the like. In this case, a lower end portion of the stator 50 is provided with a rotation preventing device 46, and a tubular locking device 47 is firmly attached to a side portion of the valve main body 20 for locking the rotation preventing device 46.

A support ring 36 is integrally connected to the rotor 30, and an upper protruding portion of a lower opened and tubular valve shaft holder 32 which is arranged in an outer periphery of the valve shaft 25 and a guide bush 26 is fixed by caulking to the support ring 36, whereby the rotor 30, the support ring 36 and the valve shaft holder 32 are integrally connected.

The screw feeding mechanism is pressed into and fixed to a fitting hole 42 provided in the valve main body 20 in its lower end portion 26a, and is constructed by a fixed thread portion (a male thread portion) 28 which is formed in an outer periphery of the tubular guide bush 26 to which (the lower large diameter portion 25a of) the valve shaft 25 is inward inserted slidably, and a movable thread portion (a female thread portion) 38 which is formed in an inner periphery of the valve shaft holder 32 and is engaged with the fixed thread portion 28.

Further, an upper small diameter portion 26b of the guide bush 26 is inward inserted to an upper portion of the valve shaft holder 32, and the upper small diameter portion 25b of the valve shaft 25 is inserted to (a through hole formed in) a center of a ceiling portion of the valve shaft holder 32. A push nut 33 is pressed into and fixed to an upper end portion of the upper small diameter portion 25b of the valve shaft 25.

Further, the valve shaft 25 is outward inserted to the upper small diameter portion 25b of the valve shaft 25, and is normally energized downward (in a valve closing direction) by a valve closing spring 34 which is constructed by a compression coil spring installed in a compression manner between the ceiling portion of the valve shaft holder 32 and an upper end terrace surface of the lower large diameter portion 25a in the valve shaft 25. A return spring 35 constructed by a coil spring is provided in an outer periphery of the push nut 33 on the ceiling portion of the valve shaft holder 32.

To the guide bush 26, there is firmly fixed a lower stopper body (a fixing stopper) 27 which constructs one of rotation and downward movement stopper mechanisms for inhibiting a further rotation and downward movement at a time when the rotor 30 is rotated and moved downward to a predetermined valve closing position, and to the valve shaft holder 32, there is firmly fixed an upper stopper body (a movable stopper) 37 which constructs another of the stopper mechanisms.

In this case, the valve closing spring 34 is arranged for obtaining a desired seal pressure in a valve closed state in which the valve body portion 24 seats on the valve port 22a (preventing a leakage), and for reducing an impact at a time when the valve body portion 24 comes into contact with the valve port 22a.

In the electrically operated valve 10' structured as mentioned above, the rotor 30 and the valve shaft holder 32 are rotated in one direction with respect to the guide bush 26 which is fixed to the valve main body 20, by supplying an electrifying and exciting pulse to the stator coils 53 and 53 in accordance with a first mode, and on the basis of a screw feeding of the fixed thread portion 28 of the guide bush 26 and the movable thread portion 38 of the valve shaft holder 32, for example, the valve shaft holder 32 moved downward, the valve body portion 24 is pressed to the valve port 22a, and the valve port 22a is closed (a fully closed state).

At a time point when the valve port 22a is closed, the upper stopper body 37 has not come into contact with the lower stopper body 27 yet, and the rotor 30 and the valve shaft holder 32 further rotate and move downward while the valve body portion 24 closes the valve port 22a. In this case, the valve shaft 25 (the valve body portion 24) does not move downward, however, the valve shaft holder 32 moves downward, whereby the valve closing spring 34 is compressed at a predetermined amount. As a result, the valve body 24 is strongly pressed to the valve port 22a, the upper stopper body 37 comes into contact with the lower stopper body 27 on the basis of the rotation and the downward movement of the valve shaft holder 32, and the rotation and the downward movement of the valve shaft holder 32 are forcibly stopped even if the pulse supply with respect to the stator coils 53 and 53 is thereafter carried on.

On the other hand, if the electrifying and exciting pulse is supplied in accordance with a second mode to the stator coils 53 and 53, the rotor 30 and the valve shaft holder 32 are rotated in a reverse direction to that mentioned above with respect to the guide bush 26 which is fixed to the valve main body 20, and the valve shaft holder 32 moves upward this time on the basis of the screw feeding of the fixed thread portion 28 of the guide bush 26 and the movable thread portion 38 of the valve shaft holder 32. In this case, since the valve closing spring 34 is compressed at the predetermined amount as mentioned above, at a time point of starting the rotation and the upward movement of the valve shaft holder 32 (a time point of starting the pulse supply), the valve body portion 24 is not disconnected from the valve port 22a and remains in the valve closed state (a lift amount=0) until the valve closing spring 34 extends at the predetermined amount mentioned above. Further, if the valve shaft holder 32 is further rotated and moved upward after the valve closing spring 34 extends at the predetermined amount, the valve body portion 24 is disconnected from the valve port 22a and the valve port 22a is opened, so that the refrigerant passes through the valve port 22a. In this case, it is possible to optionally and finely regulate the lift amount of the valve body portion 24, in other words, an effective opening area (=a valve opening degree) of the valve port 22a on the basis of an amount of rotation of the rotor 30. Further, since the amount of rotation of the rotor 30 is controlled by a supply pulse number, it is possible to control a flow rate of the refrigerant at a high precision (refer to the Japanese Unexamined Patent Publication No. 2010-249246).

Accordingly, in the case that the electrically operated valve 10' having the structure mentioned above is incorporated in place of the expansion valve with check valve into the heat pump type cooling and heating system 100, it is set to a maximum opening degree (a maximum lift amount) in such a manner as to reduce the pressure loss as much as possible, at a time when the refrigerant is circulated in one direction (at a time of the cooling operation), and it is set such as to finely control the opening degree (the lift amount) in a specific range which is equal to or less than a predetermined value in such a manner as to carry out a flow rate control, at a time when the refrigerant is circulated in another direction (at a time of the heating operation) (refer to the Japanese Unexamined Patent Publication No. 2009-14056).

In this case, in the heat pump type cooling and heating system 100 provided with the electrically operated valve 10' as mentioned above, if the refrigerant leaks to the indoor side at a time of the maintenance, all the refrigerant within the system leaks into the room inside, and there is a risk that an oxygenless state is generated. Accordingly, the following operation is carried out at a time of the maintenance.

In other words, at a time of the maintenance, the service valve 121 is closed, the service valve 122 remains in being open, the four-way switching valve 102 is set to the same state (a→d, b→c) as the time of the cooling operation, the electrically operated valve 10' is set to the fully closed state (no electrifying state), the compressor 101 is started, and the refrigerant is sucked out of the indoor side so as to be discharged to the outdoor side. In accordance with this, the refrigerant pressure within the outdoor side piping becomes large, the refrigerant pressure (the high pressure) acts on the valve shaft 25 (the valve body portion 24) from the second inlet and outlet 12 of the electrically operated valve 10', the valve shaft 25 (the valve body portion 24) is pushed up against the energizing force of the valve closing spring 34, and a part of the refrigerant is recovered into the refrigerant recovering tank 120 through the second inlet and outlet 12 of the electrically operated valve 10'→the valve port 22a→the valve chamber 21→the first inlet and outlet 11 (at this time, the electrically operated valve 10' works like a relief valve). If approximately all the refrigerant is collected in the outdoor side (between the service valves 122 and 121) including the tank 120, a desired maintenance work is carried out by closing the service valve 122 and stopping the compressor 101.

SUMMARY OF THE INVENTION

As mentioned above, if the outdoor air temperature rises after recovering the refrigerant in the tank 120 at a time of the maintenance, the pressure of the refrigerant within the tank 120 is increased. In this case, since the outlet side of the tank 120 is occluded by the service valve 121 and the electrically operated valve 10', there is a risk that such a problem that the refrigerant leaks out to the outer portion or the like is generated if the pressure of the refrigerant within the tank 120 is increased. In order to avoid this, for example, there can be thought a strategy that a flow path bypassing the electrically operated valve 10' is provided, and a relief valve opening at a predetermined pressure or more is interposed in the flow path, however, in accordance with the strategy mentioned above, the number of the parts such as the piping, the joints and the like is increased, and it takes a lot of labor hour and time with a piping connecting work, so that a cost increase of the system is caused, and an occupied space of the electrically operated valve including the relief valve is increased, and an enlargement in size of the electrically operated valve is substantially caused.

Further, if the second inlet and outlet 12 of the electrically operated valve 10' is connected to the tank 120 and the first inlet and outlet 11 is connected to the distributor 108, inversely to the illustrated example mentioned above, it is possible to automatically open the electrically operated valve 10' so as to relieve the refrigerant (the pressure) within the tank 120 to the outdoor side in the case that the pressure of the refrigerant within the tank 120 becomes higher. However, in accordance with this structure, it becomes hard to carry out a fine flow rate control at a time of the heating operation which is an inverse flow to the refrigerant recovering time and the cooling operation time (since the valve is opened at the low pressure).

The present invention is made by taking the actual condition into consideration, and an object of the present invention is to provide a valve apparatus such as an electrically operated valve, an electromagnetic valve or the like which can automatically relieve a fluid within a valve chamber in the case that a pressure of the fluid in the valve chamber becomes equal to or more than a predetermined pressure in a fully closed state, without causing a great cost increase and an enlargement of size.

In order to achieve the object mentioned above, a valve apparatus in accordance with the present invention is basically comprising:

a valve main body provided with a first inlet and outlet, a valve chamber to which a valve port is open, and a second inlet and outlet which is connected to the valve port;

a valve shaft having a valve body portion which is arranged within the valve chamber so as to open and close the valve port; and an elevation driving mechanism moving up and down the valve body portion for opening and closing the valve port, wherein a relief valve is provided within the valve body portion, the relief valve relieving a fluid pressure within the valve chamber to the second inlet and outlet in the case that the fluid pressure within the valve chamber becomes equal to or more than a predetermined pressure in a fully closed state in which the valve port is closed by the valve body portion.

The relief valve is preferably provided with a blank space formed within the valve body portion of the valve shaft, a communication passage and a relief valve port for communicating the blank space and the valve chamber, a relief valve body arranged in the blank space so as to open and close the relief valve port, and a spring member energizing the relief valve body in a direction of pressing it to the relief valve port.

Further, in the valve apparatus mentioned above, the elevation driving mechanism is provided with a stepping motor constructed by a rotor and a stator for controlling a lift amount of the valve body portion, and a screw feeding mechanism converting a rotation of the rotor into a linear movement of the valve shaft.

In the valve apparatus in accordance with the present invention, since the relief valve is provided within the valve body portion of the valve shaft, the relief valve opens and the fluid (the refrigerant) from the first inlet and outlet is relieved to the second inlet and outlet at a time when the pressure of the valve chamber becomes equal to or more than the predetermined pressure. Therefore, it is possible to make the valve apparatus be provided with the function of the relief valve, while preventing the valve apparatus from being enlarged in size.

Further, since the relief valve is provided within the valve body portion, it is possible to make a magnitude (an occupied space) of the electrically operated valve including the relief valve smaller in comparison with the case that the relief valve is provided in such a manner as to bypass the electrically operated valve, and any additional piping part and any piping connecting work are not necessary, so that it is possible to hold down a cost of the system.

Further, in the valve apparatus mentioned above, if the elevation driving mechanism is structured such as to control the lift amount of the valve body portion, it is possible to automatically relieve the pressure of the refrigerant within the tank by the relief valve within the electrically operated valve even if the outdoor air temperature rises and the pressure of the refrigerant within the tank is increased after recovering the refrigerant in the tank at a time of the maintenance, by using it in place of the conventional electrically operated valve which has been employed in the heat pump type cooling and heating system shown in FIG. 4 mentioned above, whereby it is possible to prevent such a trouble that the refrigerant leaks out to the outer portion from being generated.

DETAILED DESCRIPTION OF PREFERRED EMBODIMENT

A description will be given below of an embodiment in accordance with the present invention with reference to the accompanying drawings.

Figure 1:
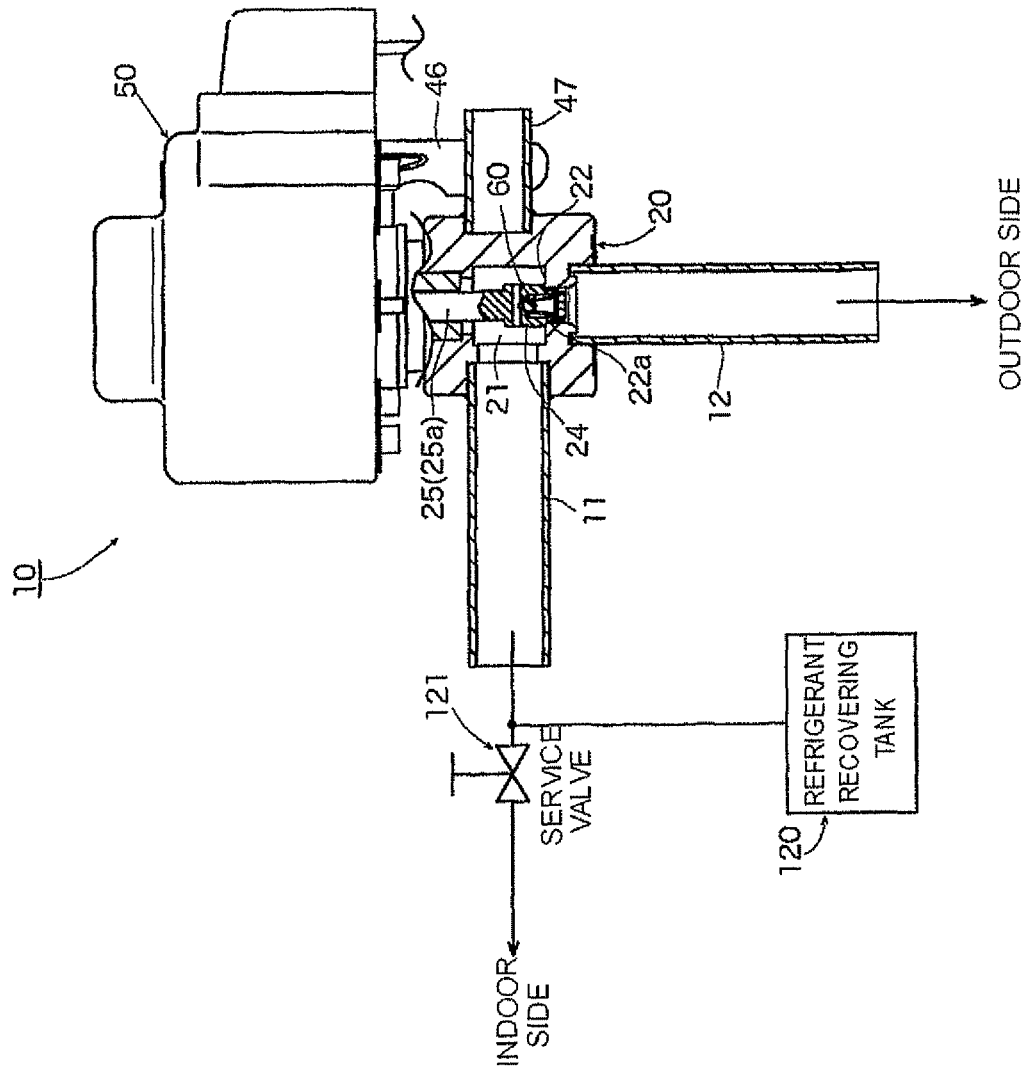
FIG. 1 is a partly omitted side elevational view showing an embodiment in the case that the present invention is applied to an electrically operated valve.
Figure 2:
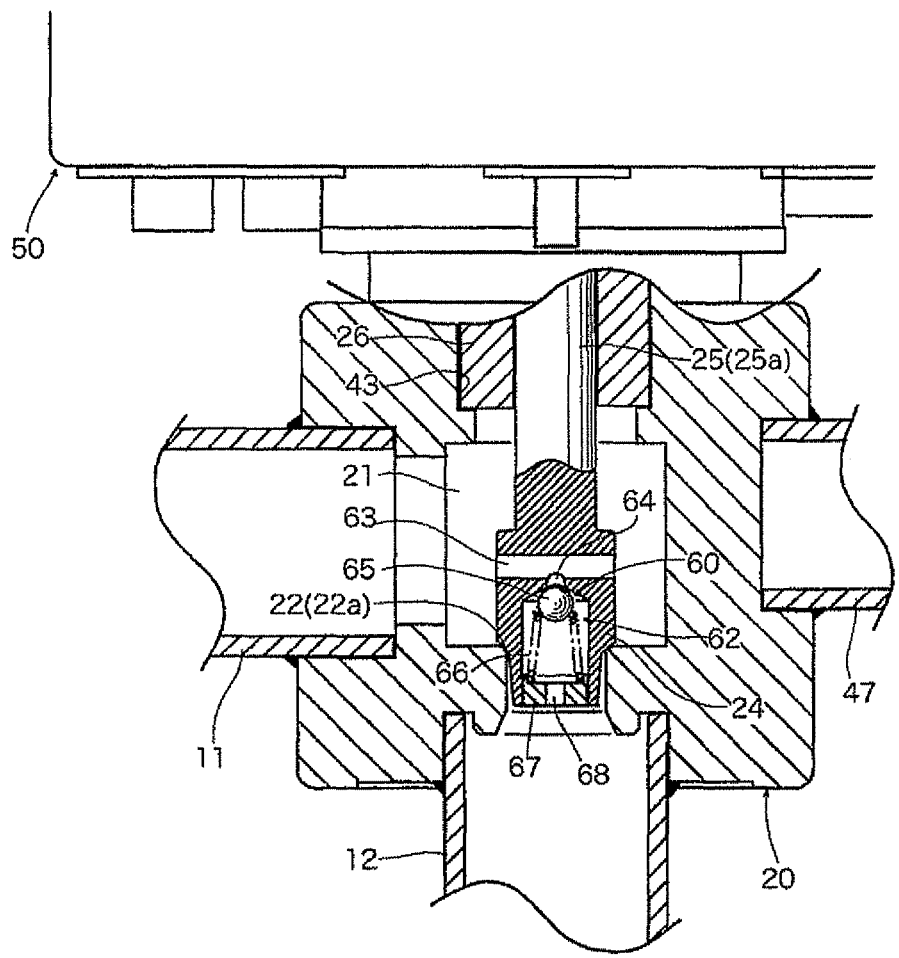
FIG. 2 is an enlarged view of a substantial part of the electrically operated valve shown in FIG. 1.

FIG. 1 is a partly omitted side elevational view showing an embodiment in the case that the present invention is applied to an electrically operated valve, and FIG. 2 is an enlarged view of a substantial part of the electrically operated valve shown in FIG. 1. An electrically operated valve 10 in accordance with an illustrated embodiment is used in place of the electrically operated valve 10' in accordance with the conventional art in a heat pump type cooling and heating system 100 shown in FIG. 4. Since a basic structure thereof is approximately the same as the electrically operated valve 10' in accordance with the conventional art shown in FIG. 3 mentioned above, an overlapping description is omitted by attaching the same reference numerals to the portions corresponding to the respective portions of the electrically operated valve 10' in accordance with the conventional art shown in FIG. 3 here, and a description will be given below mainly of a lower portion of a valve shaft 25 and a valve main body which correspond to a substantial part (a feature portion).

Figure 3:
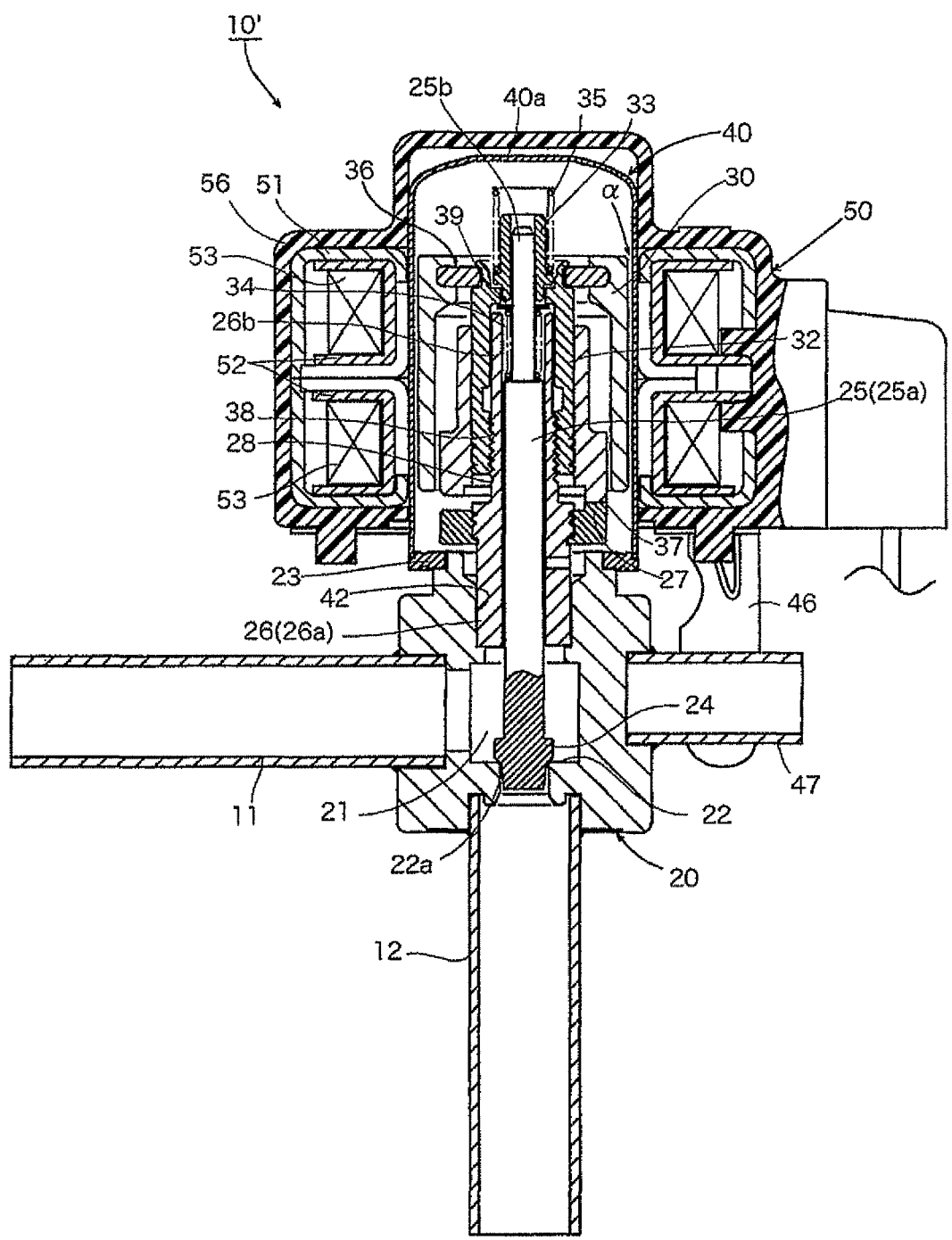
FIG. 3 is a vertical cross sectional view showing an example of a conventional electrically operated valve.
Figure 4:
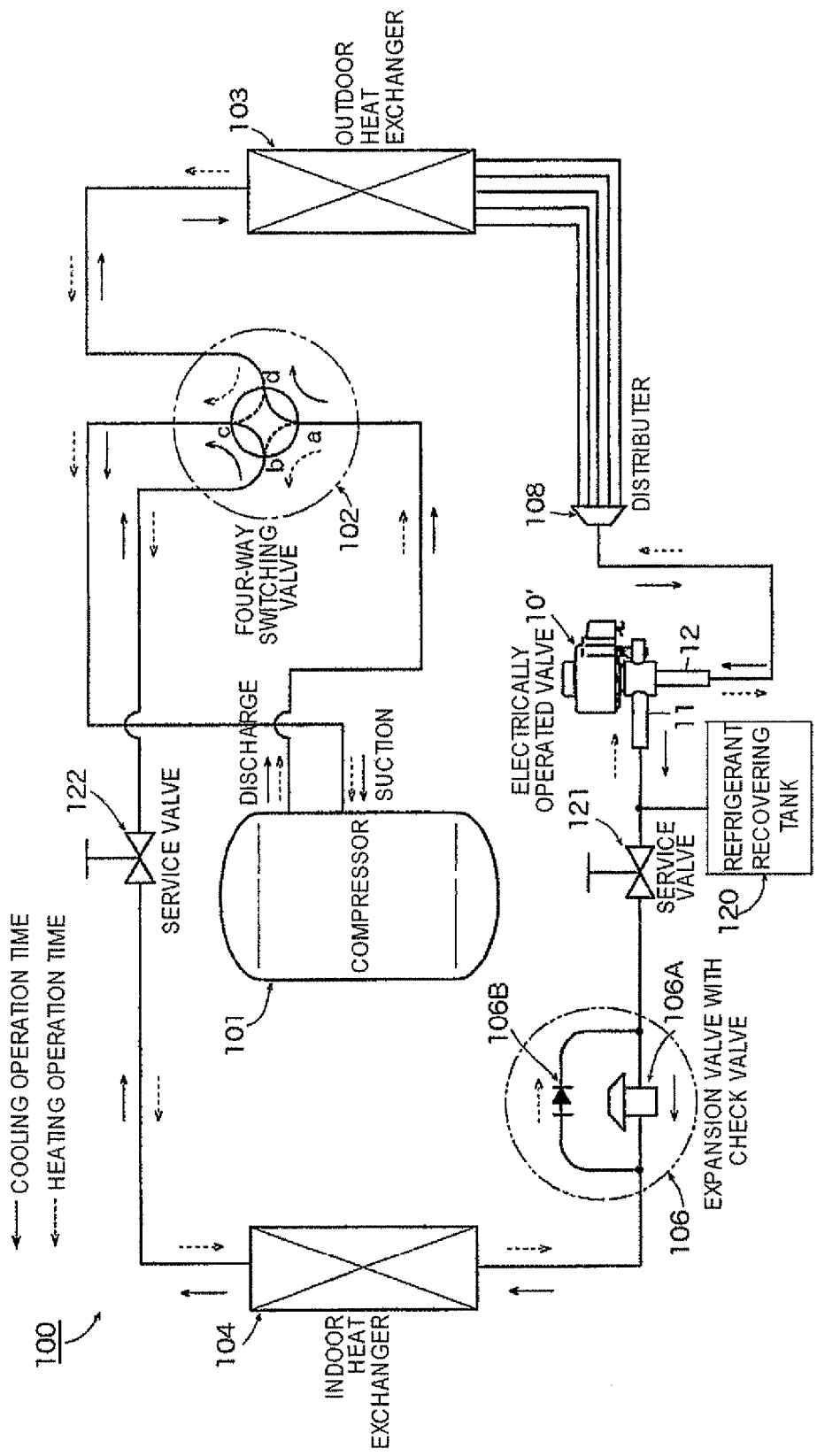
FIG. 4 is a view of an outline structure showing one example of a heat pump type cooling and heating system.

The electrically operated valve 10 in accordance with an illustrated embodiment is structured, in the same manner as the conventional example shown in FIG. 3, such that a valve main body 20 is provided with a first inlet and outlet 11, a valve chamber 21 to which a valve port 22a is opened, and a second inlet and outlet 12 which is connected to the valve port 22a, a valve body portion 24 for opening and closing the valve port 22a is provided in a lower portion of the valve shaft 25 (within the valve chamber 21), and a relief valve 60 is provided within the valve body portion 24, the relief valve 60 relieving a pressure of the valve chamber 21 to the second inlet and outlet 12 in the case that a refrigerant pressure within the valve chamber 21 becomes equal to or more than a predetermined pressure in a fully closed state in which the valve port 22a is closed by the valve body portion 24.

The relief valve 60 is provided with a lower surface opened blank space 62 which is formed within the valve body portion 24 of the valve shaft 25, a communication passage (a transverse hole) 63 and a relief valve port 64 for communicating the blank space 62 and the valve chamber 21, a relief ball valve body 65 which is arranged in an upper portion of the blank space 62 so as to open and close the relief valve port 64, and a circular truncated cone shaped coil spring 66 which energizes the relief ball valve body 65 in a direction of pressing it to the relief valve port 64.

A ceiling surface of the blank space 62 is formed as a conical surface, and the relief valve port 64 is formed in the center of the conical surface. Further, a spring bearing member 67 is fitted and fixed to a lower end portion of the blank space 62 in accordance with a press fitting or the like. A relief outlet 68 is formed in the center of the spring bearing member 67.

In the electrically operated valve 10 in accordance with the present embodiment structured as mentioned above, since the relief valve 60 having the structure mentioned above is provided within the valve body portion 24 of the valve shaft 25, the relief valve 60 opens at a time when the pressure of the valve chamber 21 becomes equal to or more than a predetermined pressure, and the refrigerant from the first inlet and outlet 11 is relieved to the second inlet and outlet 12. Therefore, in the heat pump type cooling and heating system 100 shown in FIG. 4 mentioned above, it is possible to automatically relieve the pressure of the refrigerant within the tank 120 by the relief valve 60 within the valve shaft 25 even if the outdoor air temperature rises and the pressure of the refrigerant within the tank 120 is increased after recovering the refrigerant in the tank 120 at a time of the maintenance, by using it in place of the conventional electrically operated valve 10', whereby it is possible to prevent such a trouble that the refrigerant leaks out to the outer portion from being generated.

Further, since the relief valve 60 is provided within the valve shaft 25, it is possible to make a magnitude (an occupied space) of the electrically operated valve including the relief valve smaller in comparison with the case that the relief valve is provided in such a manner as to bypass the electrically operated valve, and any additional piping part and any piping connecting work are not necessary, so that it is possible to hold down a cost of the system.

In this case, in the embodiment, there is exemplified the case that the electrically operated valve to which the present invention is applied is incorporated in the heat pump type cooling and heating system, however, it goes without saying that the incorporated case is not limited to the heat pump type cooling and heating system.

Further, the embodiments shows the case that the present invention is applied to the electrically operated valve, however, it goes without saying that the present invention is not limited to this, but may be applied to any type of valve apparatus such as an electromagnetic valve or the like as long as the relief valve is provided in the valve body portion opening and closing the valve port.

What is claimed is:

1. A valve apparatus comprising:
a valve main body provided with a first inlet and outlet, a valve chamber to which a valve port is open, and a second inlet and outlet which is connected to said valve port,
wherein the first inlet and outlet is provided to extend laterally from the valve chamber, and the second inlet and outlet is provided to extend from the bottom portion of the valve main body;
a valve shaft having a valve body portion which is arranged within said valve chamber so as to open and close said valve port;
an elevation driving mechanism moving up and down said valve body portion for opening and closing said valve port, wherein the elevation driving mechanism is provided in the valve main body;
wherein a relief valve is provided within said valve body portion elevated by the elevation driving mechanism, the relief valve relieving a fluid pressure within said valve chamber to said second inlet and outlet in the case that the fluid pressure within said valve chamber becomes equal to or more than a predetermined pressure in a fully closed state in which said valve port is closed by said valve body portion;
wherein said relief valve is provided with a blank space formed within the valve body portion of said valve shaft, a communication passage and a relief valve port for communicating said blank space and said valve chamber, a relief valve body arranged in said blank space so as to open and close said relief valve port, and a spring member energizing said relief valve body in a direction of pressing it to said relief valve port,
wherein the spring member is provided to energize the relief valve body in a direction of pressing it to the relief valve port from the second inlet and outlet side; and
wherein the relief valve opens to relieve a fluid pressure within said valve chamber to the second inlet and outlet in the case that the fluid pressure within the valve chamber becomes equal to or more than a predetermined pressure.

2. A valve apparatus as claimed in claim 1, wherein said elevation driving mechanism is constructed by a stepping motor constructed by a rotor and a stator for controlling a lift amount of said valve body portion, and a screw feeding mechanism converting a rotation of said rotor into a linear movement of the valve shaft.

* * * * *